(12) United States Patent
Kim et al.

(10) Patent No.: US 9,887,786 B2
(45) Date of Patent: Feb. 6, 2018

(54) METHOD AND APPARATUS FOR PERFORMING MEASUREMENT

(71) Applicant: LG ELECTRONICS INC., Seoul (KR)

(72) Inventors: Sangwon Kim, Seoul (KR); Jaewook Lee, Seoul (KR); Youngdae Lee, Seoul (KR); Sunghoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 163 days.

(21) Appl. No.: 14/890,355

(22) PCT Filed: May 13, 2014

(86) PCT No.: PCT/KR2014/004291
§ 371 (c)(1),
(2) Date: Nov. 10, 2015

(87) PCT Pub. No.: WO2014/185697
PCT Pub. Date: Nov. 20, 2014

(65) Prior Publication Data
US 2016/0112149 A1      Apr. 21, 2016

Related U.S. Application Data

(60) Provisional application No. 61/823,405, filed on May 15, 2013.

(51) Int. Cl.
*H04B 17/309* (2015.01)
*H04W 24/08* (2009.01)
*H04W 36/30* (2009.01)

(52) U.S. Cl.
CPC .......... *H04B 17/309* (2015.01); *H04W 24/08* (2013.01); *H04W 36/30* (2013.01)

(58) Field of Classification Search
CPC ..... H04B 17/309; H04W 24/08; H04W 36/30
See application file for complete search history.

(56) References Cited

U.S. PATENT DOCUMENTS

| | | | |
|---|---|---|---|
| 2004/0102158 A1 | 5/2004 | Schwarz et al. | |
| 2010/0061343 A1 | 3/2010 | Kazmi et al. | |
| 2011/0065393 A1 | 3/2011 | Pekonen et al. | |
| 2012/0003943 A1* | 1/2012 | Marinier | H04W 36/0083 455/73 |
| 2015/0011219 A1* | 1/2015 | Saily | H04W 24/10 455/436 |

FOREIGN PATENT DOCUMENTS

| | | |
|---|---|---|
| KR | 10-2010-0030670 A | 3/2010 |
| KR | 10-2012-0094082 A | 8/2012 |

* cited by examiner

*Primary Examiner* — Siming Liu
(74) *Attorney, Agent, or Firm* — Dentons US LLP

(57) ABSTRACT

A method for performing a measurement in a wireless communication system is provided. A terminal selects one of a plurality of measurement configurations, and performs a measurement according to the selected measurement configuration. Signaling overhead caused by frequently transferring measurement configurations can be reduced.

7 Claims, 6 Drawing Sheets

METHOD AND APPARATUS FOR PERFORMING MEASUREMENT

This application is a 35 USC § 371 National Stage entry of International Application No. PCT/KR2014/004291 filed on May 13, 2014 and claims priority to U.S. Provisional Application No. 61/823,405, filed May 15, 2013, all of which are incorporated by reference in their entirety herein.

BACKGROUND OF THE INVENTION

Field of the Invention

The present invention relates to wireless communications, and more particularly, to a method and apparatus for performing a measurement in a wireless communication system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

A measurement is used for ensuring a mobility of a user equipment (UE) or is used for offloading. Quality of a neighboring cell is measured to move the UE to a corresponding cell if a better service than a current serving cell can be provided.

With the advancement of wireless communications, various types of cells are introduced to provide various types of services to a user. For example, a closed subscriber group (CSG) cell provides a high-quality quality of service (QoS) to a specific subscriber. A micro cell such as a pico cell, a femto cell, etc., is used to disperse many users concentrated in a small coverage.

There is provided a method of performing a measurement in an environment in which various cells are concentrated.

SUMMARY OF THE INVENTION

The present invention provides a method and apparatus for performing a measurement in a wireless communication system In an aspect, provided is a method of performing a measurement by a user equipment in a wireless communication system. The method includes setting up a plurality of measurement configurations on a measurement frequency, selecting one of the plurality of measurement configurations and performing a measurement according to the selected measurement configuration on the measurement frequency.

The selecting of one of the plurality of measurement configurations may comprise selecting one of the plurality of measurement configurations according to signal quality of a reference cell.

The selecting of one of the plurality of measurement configurations may comprise selecting one of the plurality of measurement configurations according to entering or leaving a proximity of a cell on the measurement frequency.

In another aspect, provided is a user equipment for performing a measurement in a wireless communication system. The user equipment includes a radio frequency (RF) unit for transmitting and receiving a radio signal and a processor operatively coupled to the RF unit. The processor is configured for setting up a plurality of measurement configurations on a measurement frequency, selecting one of the plurality of measurement configurations and performing a measurement according to the selected measurement configuration on the measurement frequency.

A signaling overhead caused by frequently delivering measurement configurations can be reduced.

DESCRIPTION OF EXEMPLARY EMBODIMENTS

Figure 1:
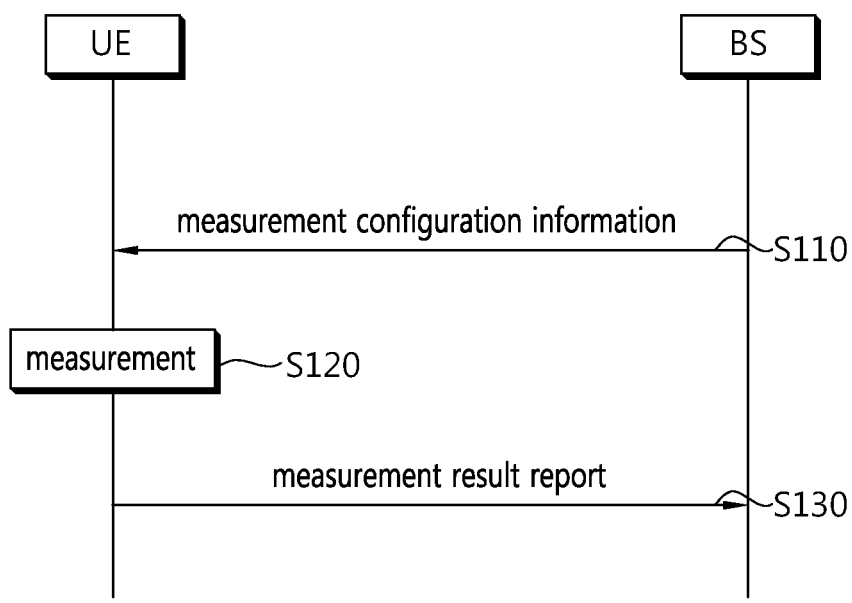
FIG. 1 is a flowchart showing the conventional method of performing a measurement.

A user equipment (UE) may be fixed or mobile, and may be referred to as another term, such as a wireless device, a mobile station (MS), a user terminal (UT), a subscriber station (SS), a mobile terminal (MT), etc. A base station (BS) is generally a fixed station which communicates with the UE and may be referred to as another term, such as an evolved-NodeB (eNB), a base transceiver system (BTS), an access point, etc.

The present invention described hereinafter is applied on the basis of $3^{rd}$ generation partnership project (3GPP) long term evolution (LTE) or 3GPP LTE-Advanced (LTE-A). This is for exemplary purposes only, and thus the present invention is applicable to various communication systems. In the following description, LTE and/or LTE-A are collectively referred to as LTE.

First, a measurement and a measurement report in 3GPP LTE are described.

It is necessary for a mobile communication system to support a mobility of a UE. Therefore, the UE persistently measures a quality for a serving cell providing a current service and a quality for a neighboring cell. The UE reports a measurement result to a network at a proper time. The network provides an optimal mobility to the UE by using a handover or the like.

If the UE on the move confirms that quality of a specific region is significantly bad through the measurement, the UE may report a measurement result and location information regarding cells with bad quality to the network. The network may attempt to optimize the network on the basis of the measurement result reported from UEs which assist the network operation.

In a mobile communication system having a frequency reuse factor of 1, a mobility is generally achieved between different cells existing in the same frequency band. Therefore, in order to properly guarantee the mobility of the UE, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network at a proper time.

A mobile communication vendor may perform a network operation by using a plurality of frequency bands. If a service of a communication system is provided through the plurality of frequency bands, an optimal mobility can be guaranteed to the UE when the UE is able to properly measure cell information and quality of neighboring cells having a center frequency different from the center frequency of the serving cell. A measurement on a cell having the center frequency different from the center frequency of the serving cell is referred to as an inter-frequency measurement.

When the UE supports a measurement on a heterogeneous network, a measurement on a cell of the heterogeneous network may be performed according to a configuration of a BS. Such a measurement on the heterogeneous network is referred to as an inter-radio access technology (RAT) measurement. For example, RAT may include a GMS EDGE radio access network (GERAN) and a UMTS terrestrial radio access network (UTRAN) conforming to the 3GPP standard, and may also include a CDMA 2000 system conforming to the 3GPP2 standard.

FIG. 1 is a flowchart showing the conventional method of performing a measurement.

In step S110, a UE receives measurement configuration information from a BS. A message including the measurement configuration information is referred to as a measurement configuration message.

In step S120, the UE performs the measurement based on the measurement configuration information.

In step S130, if a measurement result satisfies a reporting condition included in the measurement configuration information, the UE reports the measurement result to the BS. A message including the measurement result is referred to as a measurement report message.

The measurement configuration information may include the following information.

(1) Measurement object information: This information is in regards to an object for which a measurement is performed by the UE. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency band as a frequency band of a serving cell, the inter-frequency measurement object may indicate a neighboring cell having a different frequency band from a frequency band of the serving cell, and the inter-RAT measurement object may indicate a neighboring cell having a different RAT from an RAT of the serving cell.

(2) Reporting configuration information: This information is in regards to a report type and a report condition regarding when the UE reports a measurement result. The report condition may include information on a period or an event for triggering a report of the measurement result. The report type is information indicating a particular type according to which the measurement result is configured.

(3) Measurement identity information: This information is in regards to a measurement identity for determining when and in what type the UE will report a specific measurement object by associating the measurement object with a report configuration. The measurement identity information may be included in the measurement report message to indicate a specific measurement object for which the measurement result is obtained and a specific report condition according to which the measurement report is generated.

(4) Quantity configuration information: This information is in regards to a measurement unit, a reporting unit, and/or a parameter for configuring filtering of a measurement result value.

(5) Measurement gap information: This information is in regards to a measurement gap as a duration that can be used by the UE only for a measurement without consideration of data transmission with a serving cell when downlink transmission or uplink transmission is not scheduled.

To perform a measurement procedure, the UE has a measurement object list, a measurement report configuration list, and a measurement identity list.

In 3GPP LTE, the BS can assign only one measurement object to the UE with respect to one frequency band. Events for triggering a measurement report shown in the table below are defined in the section 5.5.4 of 3GPP TS 36.331 V11.3.0 (2013-03)".

TABLE 1

| Event | Report condition |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measurement result of the UE satisfies the determined event, the UE transmits a measurement report message to the BS.

Figure 2:
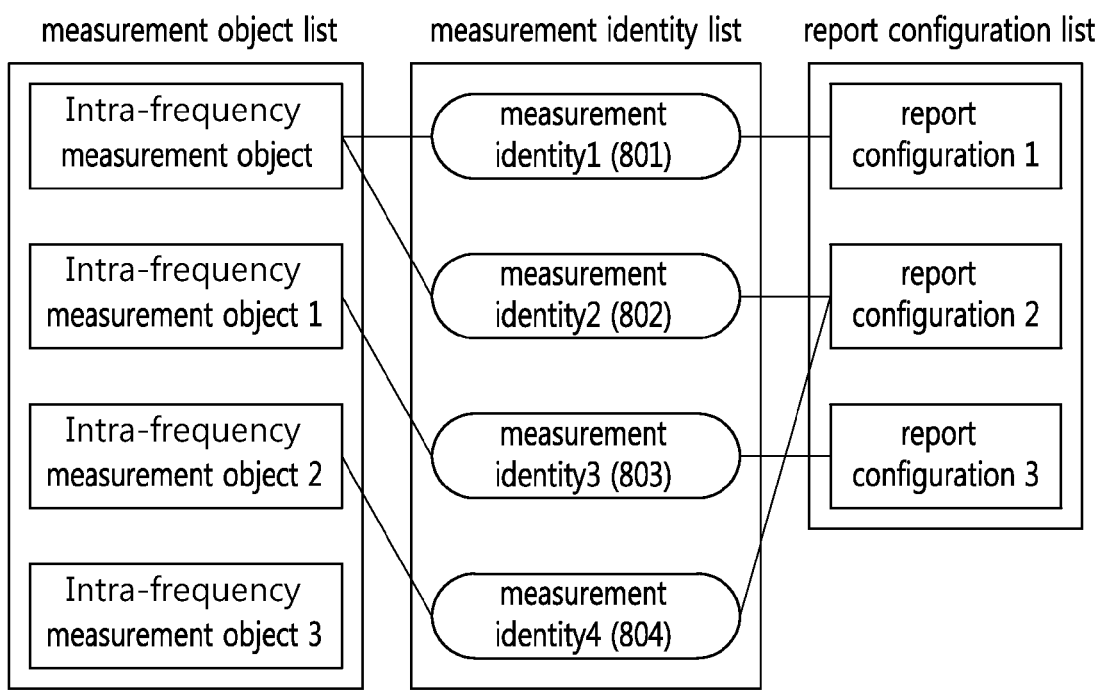
FIG. 2 shows an example of a measurement configuration assigned to a UE.

FIG. 2 shows an example of a measurement configuration assigned to a UE.

First, a measurement identity1 801 associates an intra-frequency measurement object with a report configuration 1. The UE performs an intra-frequency measurement. The report configuration 1 is used to determine a report type and a criterion for a measurement result report.

A measurement identity2 802 is associated with the intra-frequency measurement object similarly to the measurement identity1 801, and associates the intra-frequency measurement object with a report configuration 2. The UE performs an intra-frequency measurement. The report configuration 2 is used to determine a report type and a criterion for a measurement result report.

By using the measurement identity1 801 and the measurement identity2 802, the UE transmits a measurement result even if the measurement result on the intra-frequency measurement object satisfies any one of the report configuration 1 and the report configuration 2.

A measurement identity3 803 associates an inter-frequency measurement object 1 with a report configuration 3. When a measurement result on the inter-frequency measurement object 1 satisfies a report condition included in the report configuration 1, the UE reports the measurement result.

A measurement identity4 804 associates an inter-frequency measurement object 2 with the report configuration 2. When a measurement result on the inter-frequency measurement object 2 satisfies a report condition included in the report configuration 2, the UE reports the measurement result.

The measurement object, the report configuration, and/or the measurement identity can be added, modified, and/or deleted. To instruct such operations, the BS may transmit to the UE a new measurement configuration message or a measurement configuration modification message.

After receiving the measurement configuration, the UE performs a measurement on a measurement object with which a measurement identity is associated. As to a result of the performed measurement, the UE evaluates whether the result satisfies a measurement report criterion on the basis of the report configuration included in the measurement configuration. If a report criterion included in the report configuration is satisfied, the UE transmits a measurement report message including measurement report information to the network.

The measurement report message includes the following information.

Measurement identity: A measurement identity associated with the report configuration of which a report criterion is satisfied. Through this measurement identity, the network may know a specific criterion by which the measurement report received from the UE is transmitted.

Quality value of measured serving cell: A quality value of a serving cell measured by a UE.

Information of measured neighboring cell: As a measurement identity of a neighboring cell measured by a UE, this information includes a neighboring cell identity and a quality value of the neighboring cell. The neighboring cell identity is a physical cell identity of a neighboring cell which satisfies a report criterion. The quality value of the neighboring cell is a quality value of the neighboring cell which satisfies the report criterion.

Figure 3:
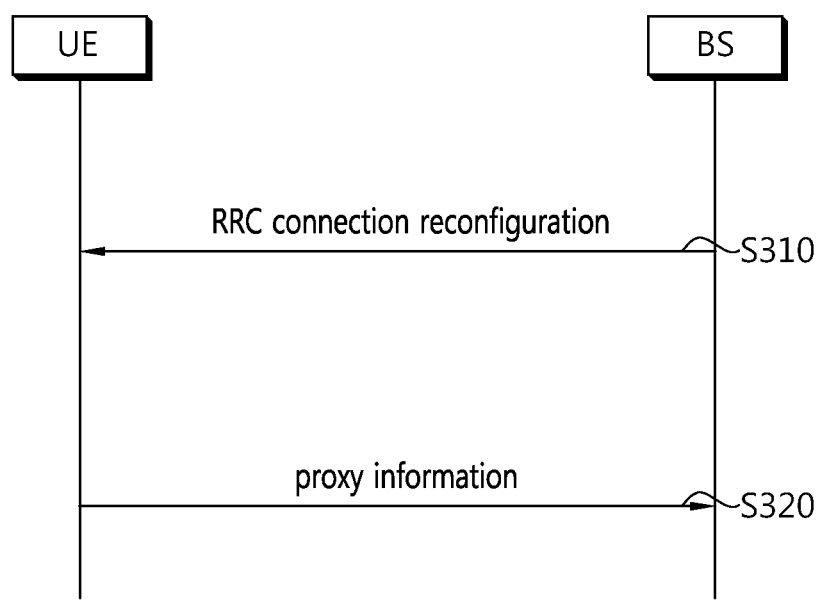
FIG. 3 shows a method of reporting proxy information according to the conventional technique.

FIG. 3 shows a method of reporting proxy information according to the conventional technique. The section 5.3.14 of 3GPP TS 36.331 V11.3.0 (2013-03) may be incorporated herein by reference.

The proxy information indicates whether a UE enters or leaves a proximity of a closed subscriber group (CSG) member cell to which the UE belongs as a member.

In step S310, the UE establishes an RRC connection configuration or RRC connection reconfiguration with respect to a network. The network may include a universal terrestrial radio access network (UTRAN) or an evolved-UTRAN (E-UTRAN). A frequency on which the E-UTRAN operates may be referred to as an E-UTRA frequency, and a frequency at which the UTRAN operates may be referred to as a UTRA frequency.

In step S320, the UE sends the proxy information to the network if a specific condition is satisfied. The specific condition includes a case where the UE leaves or enters the proximity of the CSG member cell on a specific frequency (i.e., the E-UTRA frequency or the UTRA frequency).

Now, a method of performing a measurement proposed herein is described.

It is assumed that a great number of cells are deployed in a limited region. In order to decrease power consumption caused by a frequent measurement, a UE may perform a more relaxed measurement. However, when a micro cell coexists at the same frequency together with a macro cell, if the UE performs the relaxed measurement in a boundary of the macro cell, a mobility capability may deteriorate in the macro cell. In this case, it may be better for the UE to perform a normal measurement. Alternatively, if the micro cell is detected for proper offloading, it may be more preferable for the UE to perform the normal measurement in a micro cell area.

An excessive signal overhead may be caused if the network reconfigures a measurement configuration whenever the UE enters/leaves a cell boundary or enters/leavers a cell proximity.

According to one exemplary embodiment of the present invention, a plurality of measurement configurations are given for one measurement frequency. The UE may determine which measurement configuration will be used to perform the measurement among the plurality of measurement configurations according to a specific criterion. For example, it is assumed that a measurement configuration A and a measurement configuration B are set up on an E-UTRA frequency.

The UE may select the measurement configuration on the basis of signal quality of a reference cell. The reference cell may include a primary cell (PCell). The PCell is a serving cell in which a message for adding/modifying a secondary cell (SCell) is transmitted. When a service is provided to the UE from a plurality of serving cells, one of the plurality of serving cells is the PCell, and the remaining cells are the SCells. A cell having a lowest cell index among the plurality of serving cells may be the PCell. A well-known value such as reference signal received power (RSRP) and reference signal received quality (RSRQ) may be used as the signal quality. For example, if an RSRP value of the PCell is less than or equal to a threshold, the UE may select the measurement configuration A, and otherwise, may select the measurement configuration B.

The UE may select the measurement configuration according to the cell proximity. For example, assume that the UE detects leaving a proximity for a cell to which the measurement configuration B is applied on the E-UTRA frequency. The UE may stop the measurement based on the measurement configuration B, and may start a measurement on the basis of the measurement configuration A. For another example, assume that the UE detects entering a proximity for a cell to which the measurement configuration A is applied on the E-UTRA frequency. The UE may stop the measurement based on the measurement configuration A, and may start a measurement on the basis of the measurement configuration B.

The signal quality and the measurement configuration may be combined. For example, if the signal quality is less than or equal to a threshold and if leaving a proximity is detected, the measurement configuration A may be selected. Alternatively, if the signal quality is less than or equal to the threshold or if the leaving the proximity is detected, the measurement configuration A may be selected.

The measurement configuration may include measurement gap information and information regarding at least any one of a measurement accuracy, a cell detection level, a measurement identity, and a measurement object. The measurement gap information may include information regarding a measurement gap length and/or a measurement gap repetition period.

When the measurement configuration B is a normal measurement configuration, the measurement configuration A may be a relaxed measurement configuration. For example, in comparison with the measurement configuration B, the measurement configuration A may have a shorter measurement gap length, a longer measurement gap repetition period, a relaxed measurement accuracy, and a relaxed cell detection level.

Information regarding a criterion for selecting the measurement configuration may be reported to the UE by the network. Alternatively, the selection criterion may be given for each measurement configuration.

When the UE changes the measurement configuration, information regarding the changed measurement configuration may be reported to the network. The UE may report the information regarding the changed measurement configuration to the network when reporting proxy information.

Figure 4:
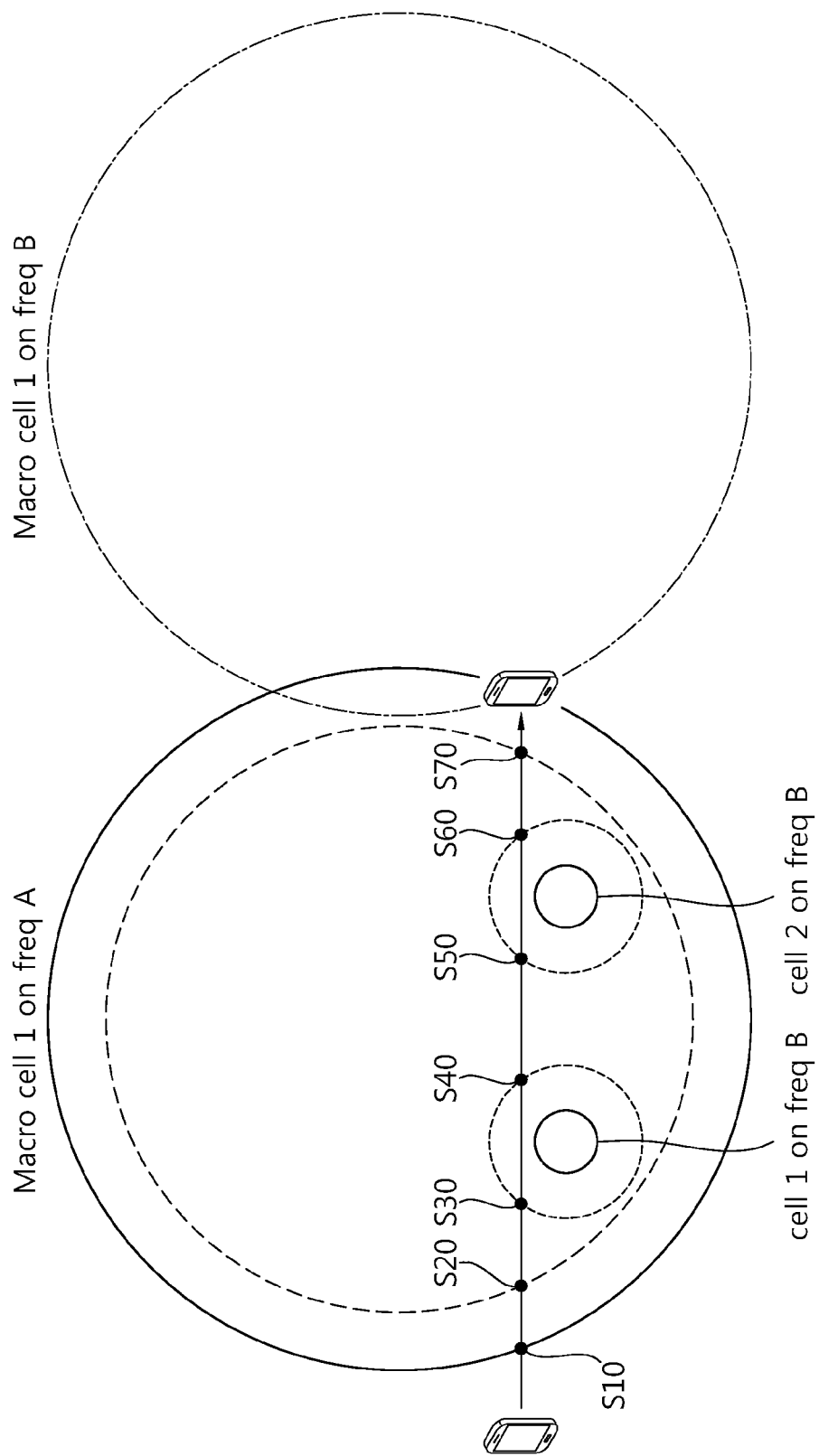
FIG. 4 shows an example of changing a measurement configuration according to an embodiment of the present invention.

FIG. 4 shows an example of changing a measurement configuration according to an embodiment of the present invention.

In step S10, a UE receives information regarding an inter-frequency measurement from a macro cell. It is assumed that a measurement configuration A and a measurement configuration B are set up on a measurement frequency B, and the measurement configuration A is a relaxed measurement configuration.

Since signal quality of a PCell is lower than a threshold, the UE performs a measurement according to the measurement configuration B at the frequency B.

In step S20, it is assumed that the signal quality of the PCell is higher than the threshold. This is a case where the UE moves to a center of the macro cell. The UE changes from the measurement frequency B to the measurement frequency A, and performs the measurement on the frequency B according to the relaxed measurement configuration.

In step S30, the UE enters a proximity of a micro cell 1 on the frequency B. The UE changes to the measurement configuration B, and performs the measurement according to the measurement configuration B.

In step S40, the UE leaves the proximity of the micro cell 1 on the frequency B. The UE may change to the measurement configuration B, and may perform the measurement according to the measurement configuration A.

In step S50, the UE enters a proximity of a micro cell 2 on the frequency B. The UE changes to the measurement configuration B, and performs the measurement according to the measurement configuration B.

In step S60, the UE leaves the proximity of the micro cell 2 on the frequency B. The UE may change to the measurement configuration B, and may perform the measurement according to the measurement configuration A.

In step S70, it is assumed that the signal quality of the PCell is lower than the threshold. The UE changes from the measurement configuration A to the measurement configuration B, and performs the measurement on the frequency B according to the measurement configuration B.

Figure 5:
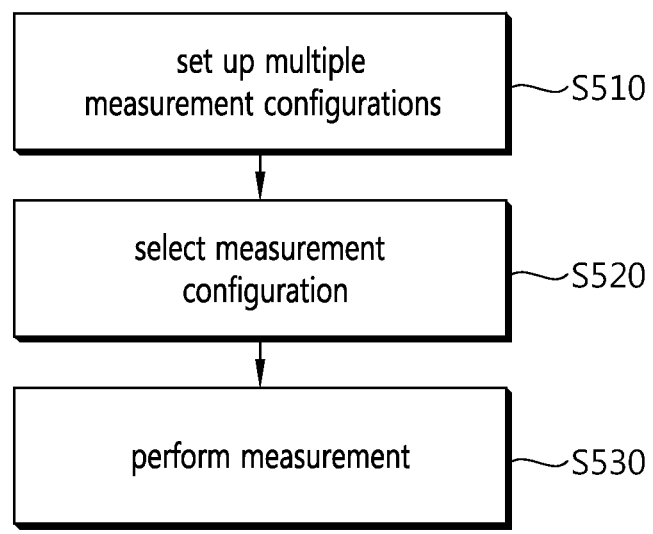
FIG. 5 is a flowchart showing a method of performing a measurement according to an embodiment of the present invention.

FIG. 5 is a flowchart showing a method of performing a measurement according to an embodiment of the present invention.

In step S510, a UE sets up a plurality of measurement configurations on a measurement frequency. Information regarding the plurality of measurement configurations may be reported to the UE by a network.

In step S520, the UE selects one of the plurality of measurement configurations. As described above, the UE may select the measurement configuration according to the reference cell's signal quality and/or cell proximity.

In step S530, the UE performs the measurement according to the selected measurement configuration on the measurement frequency.

Figure 6:
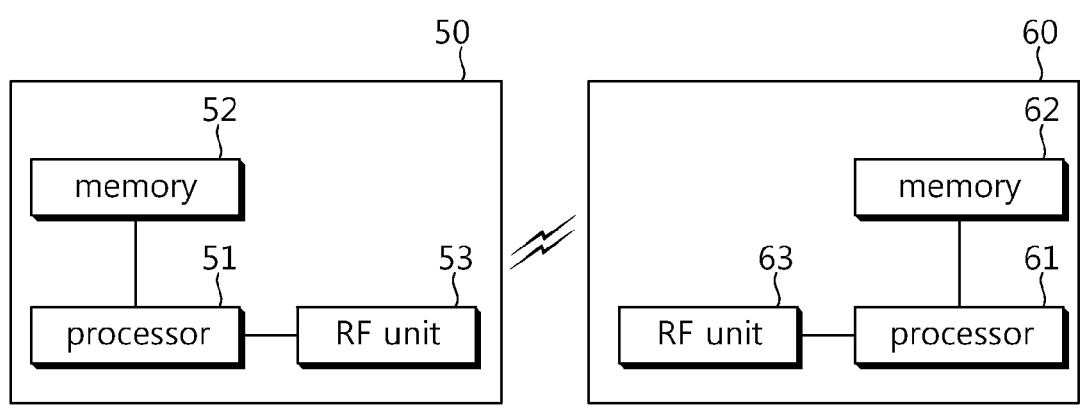
FIG. 6 is a block diagram showing a wireless communication system according to an embodiment of the present invention.

FIG. 6 is a block diagram showing a wireless communication system according to an embodiment of the present invention.

A UE 50 may include a processor 51, a memory 52, and a radio frequency (RF) unit 53.

The processor 51 implements the aforementioned operation of the UE. In the embodiments of FIG. 4 and FIG. 5, the operation of the UE may be implemented by the processor 51.

The memory 52 stores instructions for the operation of the processor 51. The stored instructions may be executed by the processor 51, and may be implemented to perform the aforementioned operation of the UE.

The RF unit 53 transmits and receives a radio signal. The processor 51 may instruct the RF unit 53 to receive or transmit the aforementioned message or data.

A BS 60 may include a processor 61, a memory 62, and an RF unit 63.

The processor 61 implements the aforementioned network operation. In the embodiments of FIG. 4 and FIG. 5, the network operation may be implemented by the processor 61.

The memory 62 stores instructions for the operation of the processor 61. The stored instructions may be executed by the processor 61, and may be implemented to perform the aforementioned network operation.

The RF unit 63 transmits and receives a radio signal. The processor 51 may instruct the RF unit 63 to receive or transmit the aforementioned message or data.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing a measurement by a user equipment in a wireless communication system, the method comprising:
    setting up a plurality of measurement configurations on a measurement frequency;
    selecting one of the plurality of measurement configurations according to whether a user equipment is within proximity to a cell on the measurement frequency; and
    performing a measurement according to the selected measurement configuration on the measurement frequency,
    wherein, when the user equipment detects that the user equipment is no longer within proximity to the cell on the measurement frequency, the user equipment selects a more relaxed measurement configuration, in terms of power consumption, than a current measurement configuration among the plurality of measurement configurations.

2. The method of claim 1, wherein the selecting of one of the plurality of measurement configurations according to whether the user equipment is within proximity to a cell on the measurement frequency comprises selecting one of the plurality of measurement configurations according to whether the user equipment is within proximity to a cell on the measurement frequency and according to signal quality of a reference cell.

3. The method of claim 2, wherein the reference cell is a primary cell (PCell).

4. The method of claim 1, wherein the plurality of measurement configurations comprise a first measurement configuration and a second measurement configuration, and the second measurement configuration comprises a measurement configuration more relaxed, in terms of power consumption, than the first measurement configuration.

5. The method of claim 4, wherein the second measurement configuration has at least one of a shorter measurement gap length and a longer measurement period than the first measurement configuration.

6. A user equipment for performing a measurement in a wireless communication system, the user equipment comprising:

a radio frequency (RF) unit for transmitting and receiving a radio signal; and a processor operatively coupled to the RF unit, that:

sets up a plurality of measurement configurations on a measurement frequency;

selects one of the plurality of measurement configurations according to whether the user equipment is within proximity to a cell on the measurement frequency; and performing a measurement according to the selected measurement configuration on the measurement frequency, wherein, when the processor detects that the user equipment is no longer within proximity to the cell on the measurement frequency, the processor selects a more relaxed measurement configuration, in terms of power consumption, than a current measurement configuration among the plurality of measurement configurations.

7. The user equipment of claim 6, wherein the processor selects one of the plurality of measurement configurations according to whether the user equipment is within a proximity of a cell on the measurement frequency and according to signal quality of a reference cell.

* * * * *